US007595602B2

(12) United States Patent
Xu

(10) Patent No.: US 7,595,602 B2
(45) Date of Patent: Sep. 29, 2009

(54) APPARATUS FOR MACHINE TOOL FEEDRATE OVERRIDE USING LIMITING PARAMETERS CORRESPONDING TO ACTUAL SPINDLE SPEED

(75) Inventor: Liangji Xu, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/965,426

(22) Filed: Dec. 27, 2007

(65) Prior Publication Data

US 2008/0100251 A1    May 1, 2008

Related U.S. Application Data

(62) Division of application No. 11/214,261, filed on Aug. 29, 2005, now Pat. No. 7,508,152.

(51) Int. Cl.
G05B 19/25 (2006.01)
(52) U.S. Cl. .................. 318/571; 318/570; 318/573; 318/569; 700/173
(58) Field of Classification Search .......... 318/570, 318/571, 573, 569; 700/173
See application file for complete search history.

(56) References Cited

U.S. PATENT DOCUMENTS

| 4,330,832 A | 5/1982 | Kohzai et al. |
| 4,513,381 A | 4/1985 | Houser et al. |
| 4,617,635 A | 10/1986 | Shimizu |
| 4,698,773 A | 10/1987 | Jeppsson |
| 4,748,554 A | 5/1988 | Gebauer et al. |
| 4,787,049 A | 11/1988 | Hirata et al. |
| 6,961,637 B2 | 11/2005 | Scherer |

FOREIGN PATENT DOCUMENTS

| GB | 2 280 866 A | 2/1995 |
| WO | WO 00/14612 A | 3/2000 |
| WO | WO 2004/077181 A | 9/2004 |

OTHER PUBLICATIONS

*Find Your Feed Rate On The Fly*, Modern Machine Shop; 4 pages; available at http://www.mmsonline.com/articles/article_print1.cfm (visited Jul. 8, 2005).

(Continued)

*Primary Examiner*—Walter Benson
*Assistant Examiner*—Renata McCloud
(74) *Attorney, Agent, or Firm*—Alston & Bird LLP

(57) ABSTRACT

An apparatus, machine tool, and method for adaptively controlling a feedrate of a machine tool are provided in which a plurality of maximum spindle power and/or radial load values, each corresponding to a spindle rotational speed, are received, stored and applied. Additionally, the current spindle power and/or the current radial load, along with the current spindle rotational speed may be received. The current spindle power and/or the current radial load may be compared to the maximum spindle power and/or radial load corresponding to the current spindle rotational speed, such that the feedrate may be reduced if the current spindle power and/or the current radial load exceed the corresponding maximum spindle power and/or radial load for the current spindle rotational speed or increased if the current spindle power and the current radial load are below the corresponding maximum spindle power and/or radial load for the current spindle rotational speed.

22 Claims, 3 Drawing Sheets

OTHER PUBLICATIONS

*Adaptive control technology for milling machines*; ferret.com.au; 3 pgs.
GE Fanuc Automation, *Milling Productivity with iAdapt*, 2 pgs.
*Vericut Optimization vs. Adaptive Controls*, 3 pgs.
OMAT Optimization & Machine Automation Technology; 3 pgs.
Landers et al., *Model-Based Machining Force Control*, Journal of Dynamic Systems, Measurement, and Control, Sep. 2000, vol. 122, pp. 521-527E.
Liang et al., *Machining Process Monitoring and Control: The State-of-the-Art*, Journal of Manufacturing Science and Engineering, May 2004, vol. 126, pp. 297-310.
Haber et al., *Embedded fuzzy-control system for machining processes Results of a case study*, Computers in Industry vol. 50 (2003) pp. 353-366.
PCT/US2006/033004 International Search Report, dated Jan. 02, 2007.
PCT/US2006/033004 Written Opinion, dated Jan. 02, 2007.

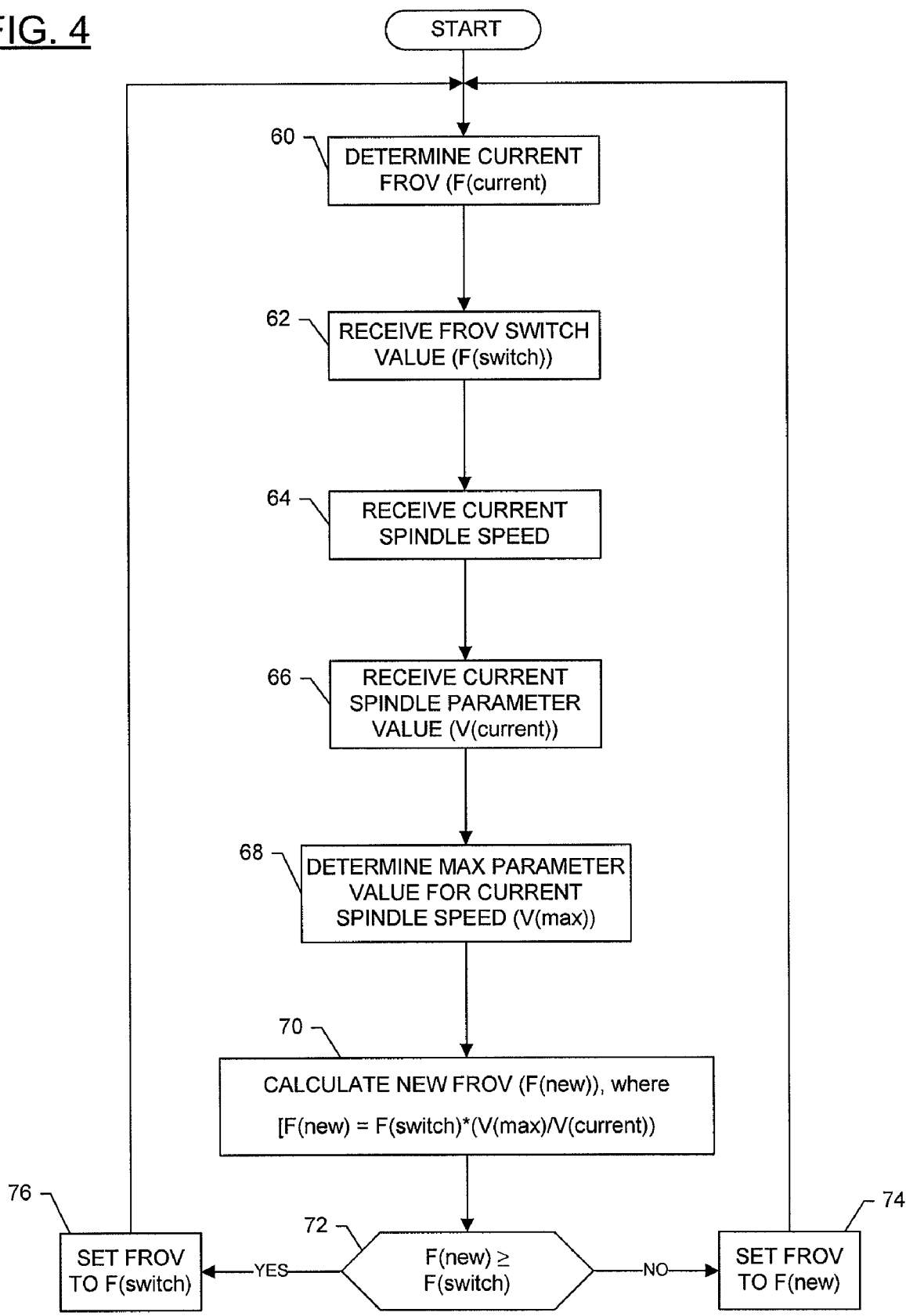

APPARATUS FOR MACHINE TOOL FEEDRATE OVERRIDE USING LIMITING PARAMETERS CORRESPONDING TO ACTUAL SPINDLE SPEED

CROSS-REFERENCE TO RELATED APPLICATIONS

This application is a divisional of U.S. application Ser. No. 11/214,261, filed Aug. 29, 2005 now U.S. Pat. No. 7,508,152, which is hereby incorporated herein in its entirety by reference.

FIELD OF THE INVENTION

The present invention relates generally to controls for machine tools, and more particularly, to an apparatus capable of controlling the feedrate override of a machine tool using limiting parameters corresponding to actual spindle speed.

BACKGROUND OF THE INVENTION

Machine tools are material cutting machines that are used in the manufacturing process for many different products. There are many types of machine tools, such as milling machines, lathes, and grinding machines. A milling machine is typically used to cut (i.e., mill) a desired shape into a raw piece of material (termed a workpiece). A milling machine typically comprises a movable table to which the workpiece is affixed. The table is typically capable of moving in two perpendicular directions, and the two different directions are typically termed the X-axis and the Y-axis. The table is typically connected to one or more devices (e.g., leadscrews) capable of translating the shaft rotation of one or more servo motors into the linear movement of the table. The movement of the table is therefore typically controlled by controlling the shaft rotation of the servo motors. The power supplied to each servo motor is typically regulated by corresponding servo amplifiers.

The table, and therefore the workpiece, is moved in a controlled manner relative to a cutting tool to enable the cutting tool to remove material from the workpiece to create the desired final product. The cutting tool typically attaches to a rotating shaft supported by rotational bearing, termed a spindle. The rotation of the spindle is driven by a spindle motor, with the power to the spindle motor regulated by a corresponding spindle amplifier. The spindle, along with the cutting tool, may also be moved relative to the workpiece to further control the removal of material from the workpiece. For example, the spindle may be moved up and down relative to the plane on which the machine tool sits. To enable the movement of the spindle relative to the workpiece, the spindle may be connected to a leadscrew which is in turn connected to a servo motor. This up and down direction is typically termed the Z-axis. While a typical three axis (i.e., X, Y, and Z) milling machine using servo motors and leadscrews is described above, many other configurations of milling machines exist. For example, milling machines may have five or more controlled axes. Additionally, milling machines may use electromagnetic linear drives, rather than servo motors and leadscrews, to move the table and the workpiece.

The rotation of all the servo motors are precisely controlled and coordinated to produce the desired movement of the workpiece relative to the cutting tool to create the desired finished shape. Additionally, the rotational speed of the spindle, and therefore the cutting tool, may also be controlled by controlling the rotational speed of the spindle motor. The servo and spindle motors and amplifiers are typically controlled by a special purpose controller, termed a computer numerical control (CNC). In addition to controlling the trajectory of the workpiece relative to the cutting tool, the CNC also controls the speed at which the workpiece is moved relative to the cutting tool. This speed is typically termed feedrate. The CNC is typically programmed to operate the machine tool at a specified feedrate desirably to utilize the machine capability without damaging the cutting tool or the spindle, or exceeding workpiece accuracy requirements.

The movement of the workpiece relative to the cutting tool as the workpiece is being milled creates both a tangential force and a radial force on the cutting tool. A torque is generated by the tangential force multiplied by the cutting tool radius and a bending moment (termed radial load) is generated by the radial force multiplied by the cutting tool length. The torque and radial load must typically be kept below a predefined maximum to prevent damage to the cutting tool and/or the spindle. The torque is typically monitored by monitoring the output power or current of the spindle amplifier. The radial load is typically monitored using strain gauges on the spindle structure. Circumstances may exist where the movement of the workpiece relative to the cutting tool at the programmed feedrate while the workpiece is being milled produces excessive torque and/or excessive radial loading. Adaptive control systems have been developed to react to the occurrence of such circumstances, such as the adaptive control system disclosed in commonly assigned U.S. Pat. No. 4,698,773 to Jeppsson, entitled Adaptive Feed Rate Override System for a Milling Machine, the contents of which are incorporated herein by reference in its entirety. Adaptive control systems typically repeatedly monitor the spindle power and the radial load as the workpiece is being milled. If the power and/or the radial load exceed a respective predefined maximum, the adaptive control system will typically cause the feedrate to be reduced to correspondingly decrease the spindle power and/or radial load. The adaptive control system may be a separate device capable of communicating with the CNC, or may be a functional element (e.g., hardware and/or software) within the CNC. The adaptive control system will typically cause this feedrate adjustment by modifying a feedrate override (FROV) parameter of the CNC. The FROV parameter is typically defined by a percentage, and the CNC typically is capable of using the FROV parameter to adjust the feedrate by that percentage. The change of the FROV parameter may be commanded by a machine operator and/or by the adaptive control system. For example, consider a machine tool in which the programmed feedrate is 20 inches per minute and the operator sets the FROV parameter to 100%. If the FROV is changed to 90% by the adaptive control system, the CNC will reduce the feedrate to 18 inches per minute. If both the power and radial load later drop below the predefined respective limits, the adaptive control system may attempt to increase the FROV back to 100% (or potentially to a FROV value greater than 100%) to increase the machining productivity.

The predefined maximum power and radial load may be determined based on, for example, the power capacity of the spindle and/or the spindle amplifier and the spindle radial load capability. The maximum power and radial load are typically loaded into parameter values in the adaptive control system at the beginning of an operation. These parameter values may be overwritten with new values as necessary. Known adaptive control systems typically use a single maximum value for each of spindle power and radial load, irrespective of the rotational speed of the spindle. However, the available spindle power and the spindle capability of sustaining the radial load both vary over the operating rotational speed range of the spindle. As such, known adaptive control systems may fail to fully utilize the spindle capacity by using maximum power and radial load values established for one spindle speed while operating at a different spindle speed.

BRIEF SUMMARY OF THE INVENTION

An apparatus, machine tool, and method for adaptively controlling a feedrate of a machine tool are therefore provided in which a plurality of maximum spindle power and/or radial load values, each corresponding to a spindle rotational speed, are received, stored and applied. Additionally, the current spindle power and/or the current radial load, along with the current spindle rotational speed may be received. The current spindle power and/or the current radial load may be compared to the maximum spindle power and/or radial load corresponding to the current spindle rotational speed, such that the feedrate may be reduced if the current spindle power and/or the current radial load exceed the corresponding maximum spindle power and/or radial load for the current spindle rotational speed.

In this regard, an apparatus for adaptively controlling a feedrate of a machine tool comprises a processing device capable of receiving spindle parameter data, the spindle parameter data comprising a plurality of spindle parameter limits and a plurality of corresponding spindle rotational speeds. The processing device may be further capable of receiving a current spindle value and a current spindle rotational speed and then comparing the current spindle value to a respective spindle parameter limit having a corresponding spindle rotational speed that has a predefined relationship to the current spindle rotational speed. The processing device may be further capable of adjusting the feedrate of the machine tool based on the comparison between the current spindle value and the respective spindle parameter limit. The plurality of spindle parameter limits and the current spindle value may both be selected from the group comprising spindle power and spindle radial load.

The processing device may be capable of comparing the current spindle value to a respective spindle parameter limit having a corresponding spindle rotational speed that has a predefined relationship to the current spindle rotational speed by comparing the current spindle value to a respective spindle parameter limit having a corresponding spindle rotational speed that is equal to the current spindle rotational speed.

In one embodiment, the apparatus further comprises a storage element capable of storing the spindle parameter data such that the processing device receives the spindle parameter data from the storage element.

The processing device may adjust the feedrate of the machine tool by adjusting a feedrate override value. The processing device may further adjust the feedrate override value based on a user-selected feedrate override value. In one embodiment, the processing device adjusts the feedrate of the machine tool by outputting a feedrate override value to a computer numeric control that is controlling the machine tool.

The processing device may reduce the feedrate of the machine tool if the current spindle value is greater than the respective spindle parameter limit and may increase the feedrate of the machine tool if the current spindle value is less than the respective spindle parameter limit. Alternatively, the processing device may increase the feedrate if the feedrate is less than a predefined maximum feedrate.

In one embodiment, the plurality of spindle parameter limits is a first plurality of spindle parameter limits, the plurality of corresponding spindle rotational speeds is a first plurality of corresponding spindle rotational speeds and the current spindle value is a first current spindle value. The spindle parameter data may comprise a second plurality of spindle parameter limits and a second plurality of corresponding spindle rotational speeds. The processing device may be further capable of receiving a second current spindle value. The processing device may be further capable of comparing a respective one of the second plurality of spindle parameter limits having a corresponding second spindle rotational speed that has a predefined relationship to the current spindle rotational speed, such that the processing device is further capable of adjusting the feedrate of the machine tool based on the comparison between the second current spindle value and the respective second spindle parameter limit. The processing device may be capable of comparing a respective one of the second plurality of spindle parameter limits having a corresponding second spindle rotational speed that has a predefined relationship to the current spindle rotational speed by comparing a respective one of the second plurality of spindle parameter limits having a corresponding second spindle rotational speed that is equal to the current spindle rotational speed. The processing device may reduce the feedrate of the machine tool if the first current spindle value is greater than the respective first spindle parameter limit or if the second current spindle value is greater than the respective second spindle parameter limit.

The processing device may be further capable of calculating a spindle parameter limit corresponding to the current spindle rotational speed if the spindle parameter data does not contain a spindle parameter limit having a corresponding spindle rotational speed that is equal to the current spindle rotational speed. The processing device may calculate the spindle parameter limit by interpolating between one of the spindle parameter limits having a corresponding spindle rotational speed that is greater than the current spindle rotational speed and one of the spindle parameter limits having a corresponding spindle rotational speed that is less than the current spindle rotational speed.

The processing device may adjust the feedrate of the machine tool based on the ratio of the respective spindle parameter limit to the current spindle value.

In addition to the apparatus for adaptively controlling the feedrate of a machine tool as described above, other aspects of the invention are directed to corresponding machine tools and methods for providing adaptive control of feedrate.

By adaptively controlling the feedrate of the machine tool according to spindle parameters corresponding to the current spindle rotational speed, embodiments of the invention fully utilize the spindle capacity by using the maximum power and radial load values established for the current spindle speed rather than potentially using a lower maximum value (and thereby a lower feedrate) established for an entire spindle speed range or potentially using a higher maximum value (and thereby a higher feedrate) established for an entire spindle speed range and consequently causing potential spindle damage.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 4 is a flowchart illustrating the operation of providing adaptive control of the feedrate of a machine tool, according to one embodiment of the invention.

DETAILED DESCRIPTION OF THE INVENTION

Embodiments of the invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
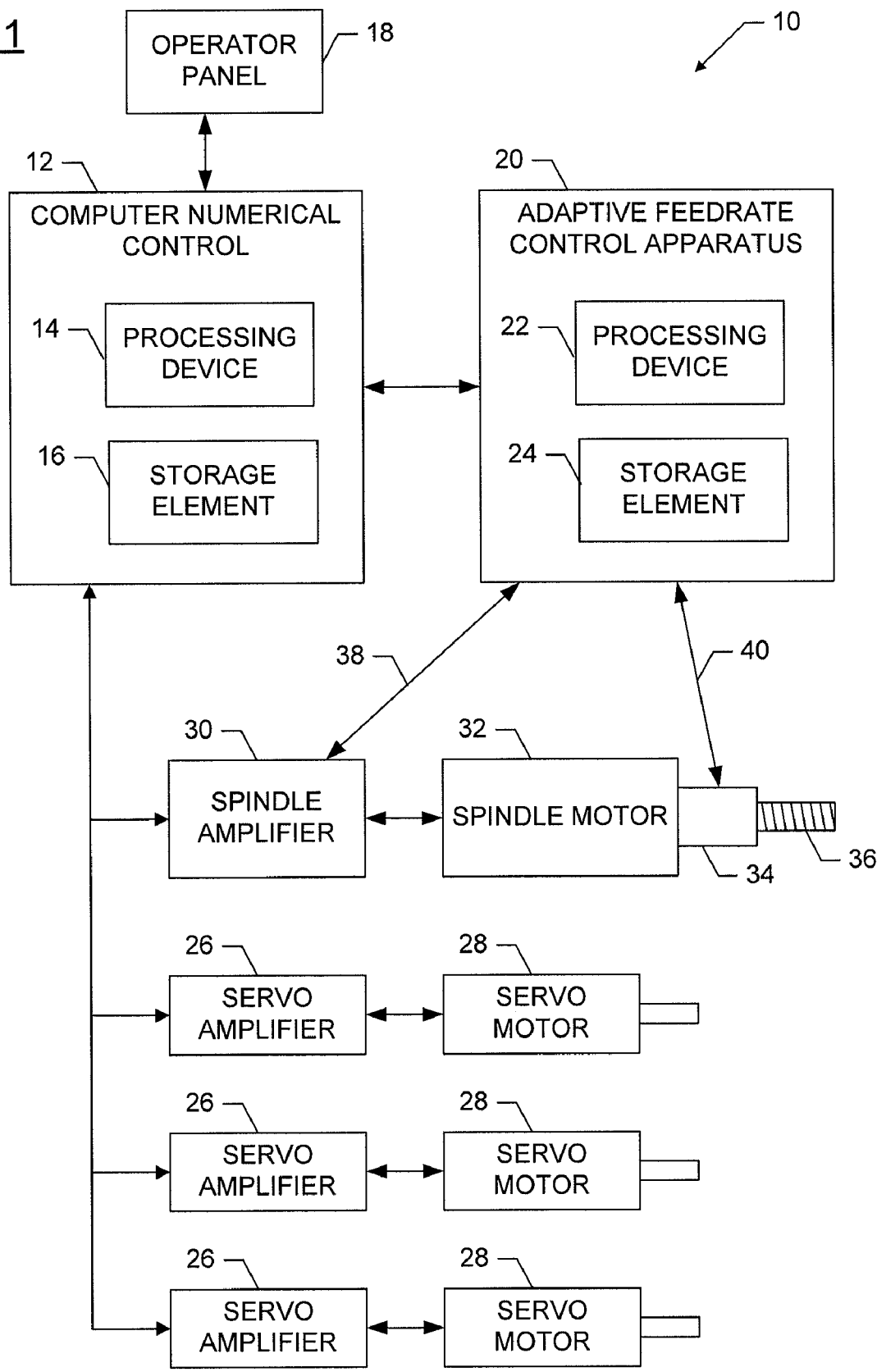
FIG. 1 is a functional block diagram of a system for providing adaptive control of the feedrate of a machine tool, according to one embodiment of the invention.

FIG. 1 is a functional block diagram of a system 10 for providing adaptive control of the feedrate of a machine tool, according to one embodiment of the invention. The system may comprise an adaptive feedrate control apparatus 20, in turn comprising a processing device 22 and a storage element 24. The processing device 22 could be, for example, a computing device, central processing unit, processor, controller, programmable gate array, or some other device that processes data. The system may further comprise a computer numerical control (CNC) 12, an operator panel 18, a plurality of servo amplifiers 26 and servo motors 28, and a spindle amplifier 30 and spindle motor 32. The servo motors are typically connected to leadscrews (not shown), which are in turn connected to the movable surfaces of the machine tool. The spindle motor is typically connected to a spindle 34, with the cutting tool 36 affixed to the spindle such that the rotation of the spindle motor causes the rotation of the cutting tool. While FIG. 1 illustrates a separate spindle motor and spindle, many machine tools use a motorized spindle in which the spindle motor is integral with the spindle. The CNC 12 typically comprises a processing device 14 and a storage element 16. The processing device 14 could be, for example, a computing device, central processing unit, processor, controller, programmable gate array, or some other device that processes data.

The storage element 16 of the CNC typically stores programs (termed part programs) that define the desired trajectories of the workpiece (not shown) relative to the cutting tool 36 of the machine tool, as well as the desired feedrates of the movements. The processing device 14 of the CNC typically executes a stored part program and translates the desired trajectory and feedrate of the stored program into the required commands to the servo amplifiers 26. The servo amplifiers provide the required power to the servo motors 28 to produce the desired trajectory at the desired feedrate. As discussed above, the desired feedrate may be adjusted by changing a feedrate override (FROV) parameter. In addition to changes to the FROV provided by the adaptive feedrate control apparatus 20, as discussed in detail below, the FROV may also be changed based on input from an operator of the machine tool. The CNC 12 is typically connected to an operator panel 18. The operator panel typically comprises input devices such as switches and pushbuttons, and output devices such as indicator lights and a display screen. The operator panel will typically include a feedrate override selector switch, which enables the operator to change the FROV as desired.

Figure 2:
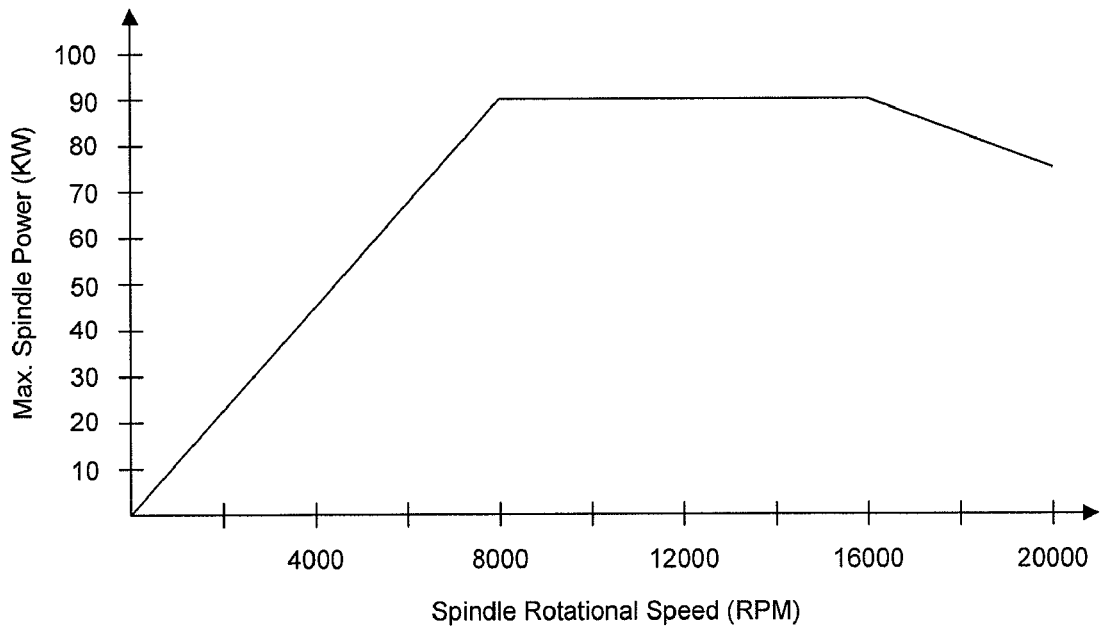
FIG. 2 is a graph of the relationship between the maximum spindle power and the spindle rotational speed for a typical spindle.
Figure 3:
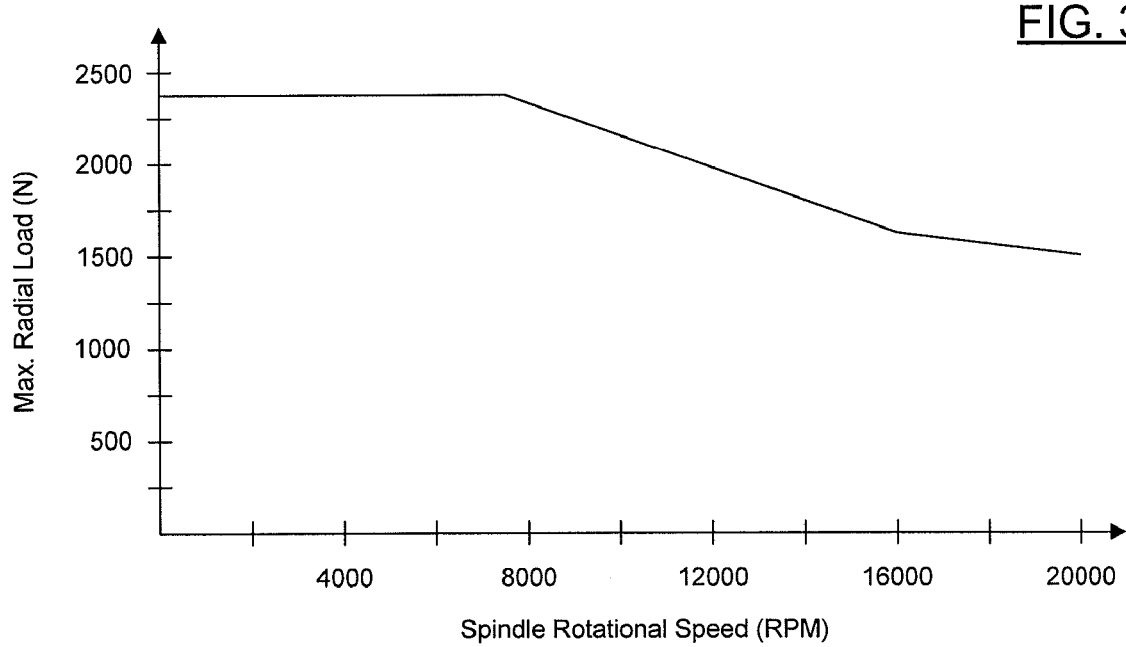
FIG. 3 is a graph of the relationship between the maximum radial load and the spindle rotational speed for a typical spindle.

The adaptive feedrate control apparatus 20 may be capable of adjusting the FROV parameter if a spindle parameter, such as spindle power or spindle load, exceeds a predefined maximum. The maximum allowed spindle power and radial load both typically vary over the operating rotational speed range of the spindle, as is illustrated in FIGS. 2 and 3. FIG. 2 illustrates the maximum allowed spindle power (in kilowatts (KW)) versus the spindle rotational speed (in revolutions per minute (RPM)) for a typical spindle, and FIG. 3 illustrates the maximum allowed radial load (in Newton-meters (Nm)) versus the spindle rotational speed (in RPM) for a typical spindle. The power versus speed data and radial load versus speed data illustrated by FIGS. 2 and 3, respectively, may be collectively termed spindle parameter data. The processing device 22 of the adaptive feedrate control apparatus 20 may receive spindle parameter data (for spindle power and/or radial load) and may store the data in storage element 24. The processing device 22 may receive the data in any suitable format, such as in a table. The processing device may receive separate tables for each parameter, or may receive a combined table as illustrated by Table 1.

TABLE 1

| Spindle Speed (RPM) | Max. Spindle Power (KW) | Max. Radial Load (Nm) |
|---|---|---|
| 2000 | 23 | 2375 |
| 4000 | 45 | 2375 |
| 6000 | 68 | 2375 |
| 8000 | 90 | 2325 |
| 10000 | 90 | 2125 |
| 12000 | 90 | 2000 |
| 14000 | 90 | 1750 |
| 16000 | 90 | 1625 |
| 18000 | 83 | 1575 |
| 20000 | 75 | 1500 |

Table 1 illustrates a typical spindle parameter data table. However, spindle parameter data tables may contain less or more data than is illustrated in Table 1. The processing device 22 may receive the data from a user of the system, or the data may be embedded in the part program stored in the CNC 12 and transferred to the adaptive feedrate control apparatus 20 during execution of the part program. While exemplary embodiments of the invention described herein are capable of controlling the feedrate of a machine tool according to two spindle parameters (spindle power and/or spindle load) corresponding to the current spindle rotational speed, embodiments of the invention are not limited to using two spindle parameters or to specifically using spindle power and/or spindle load parameters. Additional and/or alternative spindle parameters may be used to control the feedrate of a machine tool, in accordance with embodiments of the invention.

In addition to receiving the maximum spindle power and/or maximum radial load data, the processing device 22 also typically receives the current spindle rotational speed and the current spindle power and/or radial load (depending on whether the adaptive feedrate control apparatus is monitoring one or both values). The processing device 22 will typically receive such data repeatedly during the execution of the program by the CNC 12, such as every 0.1 milliseconds. The processing device 22 may receive the current spindle rotational speed and the current spindle power from the spindle amplifier, as illustrated by line 38. The processing device 22 may receive the radial load from strain gauges (not shown) installed on the spindle 34, as illustrated by line 40.

After the adaptive feedrate control apparatus 20 receives the current spindle rotational speed, the apparatus typically determines the maximum spindle power and/or the maximum radial load corresponding to the current spindle rotational speed. The apparatus may determine the maximum value(s) by accessing the parameter data stored in the storage element 24, as discussed above. However, the parameter data may not have maximum value(s) stored for every possible spindle rotational speed. For example, a spindle speed range may be 0 to 20000 RPM, and the parameter data would typically not have 20000 data points. If the current spindle rotational speed is not contained in the stored parameter data, the adaptive feedrate control apparatus 20 may determine the maximum spindle power and/or maximum radial load from the available data, such as by interpolating between the maximum value(s) corresponding with a spindle speed in the data that is higher than the current spindle speed and the maximum value(s) corresponding with a spindle speed in the data that is lower than the current spindle speed.

The processing device 22 may then compare the received current spindle power and/or radial load to the respective maximum spindle power and/or radial load corresponding to the current spindle rotational speed. If the current spindle power and/or radial load exceed the respective maximum, the processing device 22 would typically determine a FROV to send to the CNC 12 to direct the CNC to reduce the feedrate. As discussed above, the FROV is typically expressed as a percentage that is used to scale (up or down) the programmed feedrate.

While FIG. 1 illustrates the adaptive feedrate control apparatus 20 as a separate device from the CNC, the functionality of the adaptive feedrate control apparatus may alternatively be performed within the CNC, such as by the processing device 14, with the spindle parameter data stored in the storage element 16.

Referring now to FIG. 4, the operation of providing adaptive control of the feedrate of a machine tool is illustrated, according to one embodiment of the invention. The operation illustrated in FIG. 4 is typically performed repeatedly, for example by processing device 22, during the execution of a program by the CNC. The processing device would typically determine the current FROV ("F(current)"). See block 60. If the operation illustrated by FIG. 4 has not yet been performed, then the current FROV would likely be the feedrate set by the override switch. However, the FROV may be some other value if the operation has been previously performed. The processing device would typically receive the FROV set by the operator ("F(switch)") using a feedrate override switch. See block 62. The processing device would typically receive the current spindle speed, such as from the spindle amplifier as discussed above. See block 64. The processing device would typically receive the current spindle value (e.g., spindle power and/or radial load) ("V(current)"). See block 66. As discussed above, the current spindle power value may be received from the spindle amplifier and the radial load may be received from strain gauges. Using the current spindle rotational speed, the processing device would typically access the spindle parameter data stored in the storage element to determine the maximum allowed spindle value (e.g., spindle power and/or radial load) ("V(max)") corresponding to the current spindle rotational speed or calculate the V(max) through interpolation if the current spindle rotational speed is not contained in the stored parameter data. See block 68.

The processing device may adjust the FROV based on the relationship between the current spindle value and the maximum spindle parameter value corresponding to the current spindle speed. The processing device may decrease the FROV if the current spindle value exceeds the maximum value for the current spindle speed. This will typically cause the CNC to reduce the feedrate and therefore reduce the spindle value. Alternatively, the processing device may increase the FROV if the current spindle value is less than the maximum value for the current spindle speed. There are many different methods by which the processing device may adjust the FROV based on the relationship between the current spindle value and the maximum spindle parameter value corresponding to the current spindle speed. The processing device may calculate the new FROV ("F(new)") using the formula: F(new)=F(switch)*(V(max)/V(current)). See block 70. If V(max) is less than V(current), the processing device would decrease the FROV using this formula. If V(max) is greater than V(current), the processing device would increase the FROV using this formula.

The above formula may result in a new FROV, F(new), greater than F(switch). The processing device may or may not send a new FROV that is greater than F(switch) to the CNC, depending on several factors such as the capability of the machine tool to support a feedrate higher than the programmed feedrate multiplied by F(switch). FIG. 4 illustrates an operation in which the processing device would not send a new FROV greater than F(switch) to the CNC. After the processing device determines the new FROV, the processing device may determine if the new FROV is greater than or equal to F(switch). See block 72. If the new FROV is less than F(switch), the processing device may output the new FROV to the CNC such that the new FROV becomes the current FROV and scales (up or down) the programmed feedrate. See block 74. If the new FROV is greater than or equal to F(switch), the processing device may output a FROV equal to F(switch) to the CNC, such that the CNC moves the workpiece relative to the cutting tool at the programmed feedrate multiplied by F(switch). See block 76. As discussed above, blocks 60 through 76 of FIG. 4 would typically be repeatedly executed while the CNC executes the part program, or possibly only during that portion of the part program where milling of the workpiece is occurring.

According to one exemplary aspect of the invention, the functions performed by one or more of the entities of the system, such as processing device 22, may be performed by various means, such as hardware and/or firmware, including those described above, alone and/or under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

In this regard, FIG. 4 is a flowchart of methods and program products according to the invention. It will be understood that each step of the flowchart, and combinations of steps in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart step(s).

Accordingly, steps of the flowchart support combinations of means for performing the specified functions, combinations of steps for performing the specified functions and program instruction means for performing the specified functions. It will also be understood that each step of the flowchart, and combinations of steps in the flowchart, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A machine tool comprising:
   a machine base;
   a workpiece holder supported by the machine base;
   at least one spindle to which at least one cutting tool is fixedly secured;
   a plurality of servo motors;
   at least one spindle motor capable of rotating the at least one spindle;
   a computer numerical control (CNC) capable of directing the operation of the servo motors to control movement of the workpiece relative to the cutting tool; the CNC further capable of directing the operation of the spindle motor to control a current spindle rotational speed; and
   a feedrate control apparatus for controlling a feedrate of the workpiece relative to the cutting tool, the apparatus capable of receiving spindle parameter data, the spindle parameter data comprising a plurality of spindle parameter limits and a plurality of corresponding spindle rotational speeds; the apparatus further capable of receiving a current spindle value and the current spindle rotational speed; the apparatus configured to determine a respective spindle parameter limit by interpolating between the spindle parameter limits of the spindle parameter data based upon a relationship of the current spindle rotational speed to the corresponding spindle rotational speeds of the spindle parameter data, the apparatus further capable of comparing the current spindle value to the respective spindle parameter limit; and the apparatus further capable of adjusting the feedrate of the machine tool based on the comparison between the current spindle value and the respective spindle parameter limit.

2. The machine tool of claim 1, wherein the apparatus is capable of comparing the current spindle value to a respective spindle parameter limit having a corresponding spindle rotational speed that has a predefined relationship to the current spindle rotational speed by comparing the current spindle value to a respective spindle parameter limit having a corresponding spindle rotational speed that is equal to the current spindle rotational speed.

3. The machine tool of claim 1, wherein the plurality of spindle parameter limits and the current spindle value are both selected from the group comprising spindle power and spindle radial load.

4. The machine tool of claim 1, further comprising:
   a storage element capable of storing the spindle parameter data such that the feedrate control apparatus receives the spindle parameter data from the storage element.

5. The machine tool of claim 1, wherein the apparatus is configured to adjust the feedrate of the machine tool by adjusting a feedrate override value.

6. The machine tool of claim 5, wherein the apparatus is further configured to adjust the feedrate override value based on a user-selected feedrate override value.

7. The machine tool of claim 1, wherein the apparatus is configured to adjust the feedrate of the machine tool by outputting a feedrate override value to the CNC.

8. The machine tool of claim 1, wherein the apparatus is configured to reduce the feedrate of the machine tool if the current spindle value is greater than the respective spindle parameter limit.

9. The machine tool of claim 1, wherein the apparatus is configured to increase the feedrate of the machine tool if the current spindle value is less than the respective spindle parameter limit.

10. The machine tool of claim 9, wherein the apparatus is configured to increase the feedrate if the feedrate is less than a predefined maximum feedrate.

11. A machine tool comprising:
    a machine base;
    a workpiece holder supported by the machine base;
    at least one spindle to which at least one cutting tool is fixedly secured;
    a plurality of servo motors;
    at least one spindle motor capable of rotating the at least one spindle;
    a computer numerical control (CNC) capable of directing the operation of the servo motors to control movement of the workpiece relative to the cutting tool; the CNC further capable of directing the operation of the spindle motor to control a current spindle rotational speed; and
    a feedrate control apparatus for controlling a feedrate of the workpiece relative to the cutting tool, the apparatus capable of receiving spindle parameter data, the spindle parameter data comprising first and second pluralities of spindle parameter limits and first and second pluralities of corresponding spindle rotational speeds such that different spindle parameters have different spindle rotational speeds, wherein the feedrate control apparatus is further capable of receiving first and second current spindle values;
    wherein the apparatus is further configured to compare the first current spindle value to a respective first spindle parameter limit having a corresponding first spindle rotational speed that has a predefined relationship to the current spindle rotational speed, wherein the apparatus is also configured to compare the second current spindle value to a respective one of the second spindle parameter limits having a corresponding second spindle rotational speed that has a predefined relationship to the current spindle rotational speed;
    wherein the apparatus is further configured to adjust the feedrate of the machine tool based on the comparison between at least one of: (i) the first current spindle value and the respective first spindle parameter limit and (ii) the second current spindle value and the respective second spindle parameter limit.

12. The machine tool of claim 11, wherein the apparatus is capable of comparing the first and second current spindle values to respective spindle parameter limits having corresponding spindle rotational speeds that have predefined relationships to the first and second current spindle rotational speeds by comparing the first and second current spindle values to respective spindle parameter limits having corresponding spindle rotational speeds that are equal to the first and second current spindle rotational speeds.

13. The machine tool of claim 11, wherein the plurality of first and second spindle parameter limits and the first and second current spindle values are selected from the group comprising spindle power and spindle radial load.

14. The machine tool of claim 11, further comprising:
a storage element capable of storing the spindle parameter data such that the feedrate control apparatus receives the spindle parameter data from the storage element.

15. The machine tool of claim 11, wherein the apparatus is configured to adjust the feedrate of the machine tool by adjusting a feedrate override value.

16. The machine tool of claim 15, wherein the apparatus is further configured to adjust the feedrate override value based on a user-selected feedrate override value.

17. The machine tool of claim 11, wherein the apparatus is configured to adjust the feedrate of the machine tool by outputting a feedrate override value to the CNC.

18. The machine tool of claim 11, wherein the apparatus is configured to reduce the feedrate of the machine tool if at least one of: (i) the first current spindle value is greater than the respective first spindle parameter limit and (ii) the second current spindle value is greater than the respective second spindle parameter limit.

19. The machine tool of claim 11, wherein the apparatus is configured to increase the feedrate of the machine tool if at least one of: (i) the first current spindle value is less than the respective first spindle parameter limit and (ii) the second current spindle value is less than the respective second spindle parameter limit.

20. The machine tool of claim 19, wherein the apparatus is configured to increase the feedrate if the feedrate is less than a predefined maximum feedrate.

21. The machine tool of claim 11, wherein the feedrate control apparatus is configured to determine a respective spindle parameter limit corresponding to the current spindle rotational speed that fails to match any one of the respective plurality of corresponding spindle rotational speeds, and wherein the feedrate control apparatus is configured to determine the respective spindle parameter limit based upon a relationship of the current spindle rotational speed to the respective plurality of spindle rotational speeds and the corresponding spindle parameter limits.

22. The machine tool of claim 11 wherein the feedrate control apparatus is configured to determine a respective spindle parameter limit by interpolating between the spindle parameter limits of the spindle parameter data based upon a relationship of the current spindle rotational speed to the corresponding spindle rotational speeds of the spindle parameter data.

* * * * *